United States Patent [19]

Ferguson et al.

[11] Patent Number: 4,477,107
[45] Date of Patent: Oct. 16, 1984

[54] ROTATING JOINT WITH SEPARATED BEARINGS AND SEALS

[75] Inventors: George R. Ferguson, Clover, S.C.; William W. Royer, Charlotte, N.C.

[73] Assignee: Duff-Norton Company, Inc., Charlotte, N.C.

[21] Appl. No.: 325,214

[22] Filed: Nov. 27, 1981

[51] Int. Cl.³ ............................................. F16L 39/04
[52] U.S. Cl. ..................................... 285/134; 285/279
[58] Field of Search ............... 285/134, 279, 281, 267, 285/268, 269

[56] References Cited

U.S. PATENT DOCUMENTS

| | | | |
|---|---|---|---|
| 2,791,449 | 5/1957 | Monroe | 285/134 |
| 2,794,659 | 6/1957 | Bily | 285/134 |
| 2,805,087 | 9/1957 | Shaw et al. | 285/134 |
| 2,873,538 | 2/1959 | Shumaker | 285/134 X |

FOREIGN PATENT DOCUMENTS 555389  8/1943  United Kingdom ............... 285/134

Primary Examiner—Dave W. Arola
Attorney, Agent, or Firm—Richards, Shefte & Pinckney

[57] ABSTRACT

A rotating joint for establishing supply and return fluid flow connections between stationary piping and a rotating drum and syphon pipe and in which separate bearings and seals are provided for a drum shaft and a syphon pipe.

6 Claims, 3 Drawing Figures

ROTATING JOINT WITH SEPARATED BEARINGS AND SEALS

FIELD AND BACKGROUND OF INVENTION

This invention relates to rotating joints, and particularly to rotating joints for establishing supply and return fluid flow connections between stationary piping and a rotating drum and syphon pipe or the like.

It has been known heretofore to employ rotating joints for establishing fluid flow connections between stationary piping and rotating machine elements such as drums and the like. Particularly in applications where steam is being delivered for heating drums and other elements, with condensate to be removed from the drums, a rotating joint must establish both supply and return fluid flow connections. Various arrangements for such joints have been proposed heretofore, including arrangements in which a syphon pipe is stationary and arrangements in which a syphon pipe is rotating with the drum and the like.

Rotating syphon pipe installations using rotating joints which establish both supply and return fluid flow connections have, heretofore, presented certain difficulties. Many such difficulties arise from the fact that the rotating syphon pipe does not necessarily maintain a constant position within the drum. Where significant quantities of water may collect within the drum and may impinge upon the syphon pipe with rotation of the drum, the force exerted by such water may dislodge and "walk" the syphon pipe about. Such movement of a syphon pipe may result in misalignment of the syphon pipe relative to the drum or roll journal to which the rotating joint is connected. As will be appreciated, such misalignment results in significantly accelerated wear of the rotating joint, and possible damage to the journal and syphon pipe.

BRIEF DESCRIPTION OF INVENTION

With the aforementioned background in mind, it is an object of the present invention to overcome the deficiencies and difficulties possibly encountered with the installation of a rotating joint of the type which establishes supply and return flow connections between stationary piping and a rotating drum and syphon pipe. In realizing this object of the present invention, the bearing and seal means are separated in order that distinct bearing and seal means may be provided for connection with the journal of the drum or roll and for connection with the syphon pipe.

Yet a further object of the present invention is to provide a rotating joint for establishing supply and return fluid flow connections between stationary piping and a rotating drum and syphon pipe wherein wear of the seal elements involved is minimized while replacement of the seal elements, as such becomes necessary, is facilitated. In realizing this object of the present invention, the rotating joint described more fully hereinafter is assembled in a manner which facilitates disassembly and separation of the sealing components employed.

BRIEF DESCRIPTION OF FIGURES

Some of the objects of the invention having been stated, other objects will appear as the description proceeds, when taken in connection with the accompanying drawings, in which.

DETAILED DESCRIPTION OF INVENTION

Figure 1:
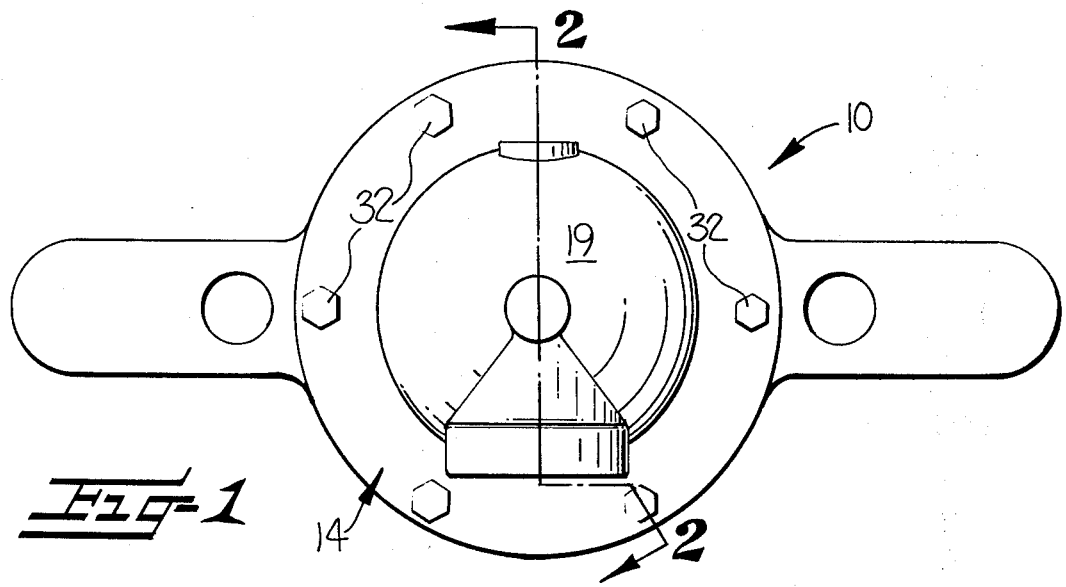
FIG. 1 is an end elevation view of the rotating joint of this invention.
Figure 2:
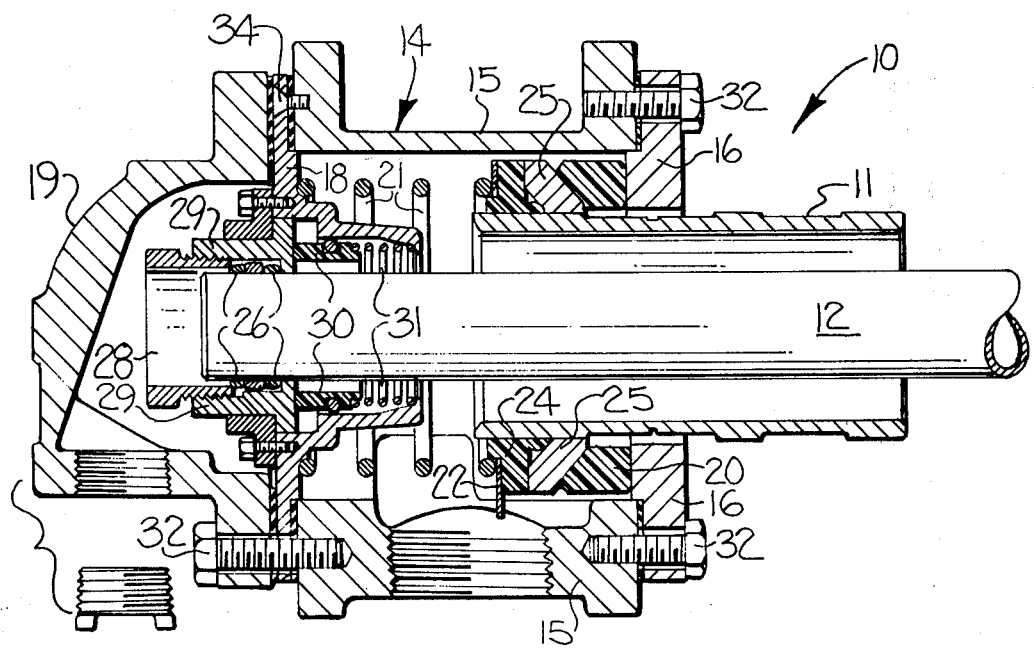
FIG. 2 is an elevation view, in section, taken generally along the line 2—2 in FIG. 1.
Figure 3:
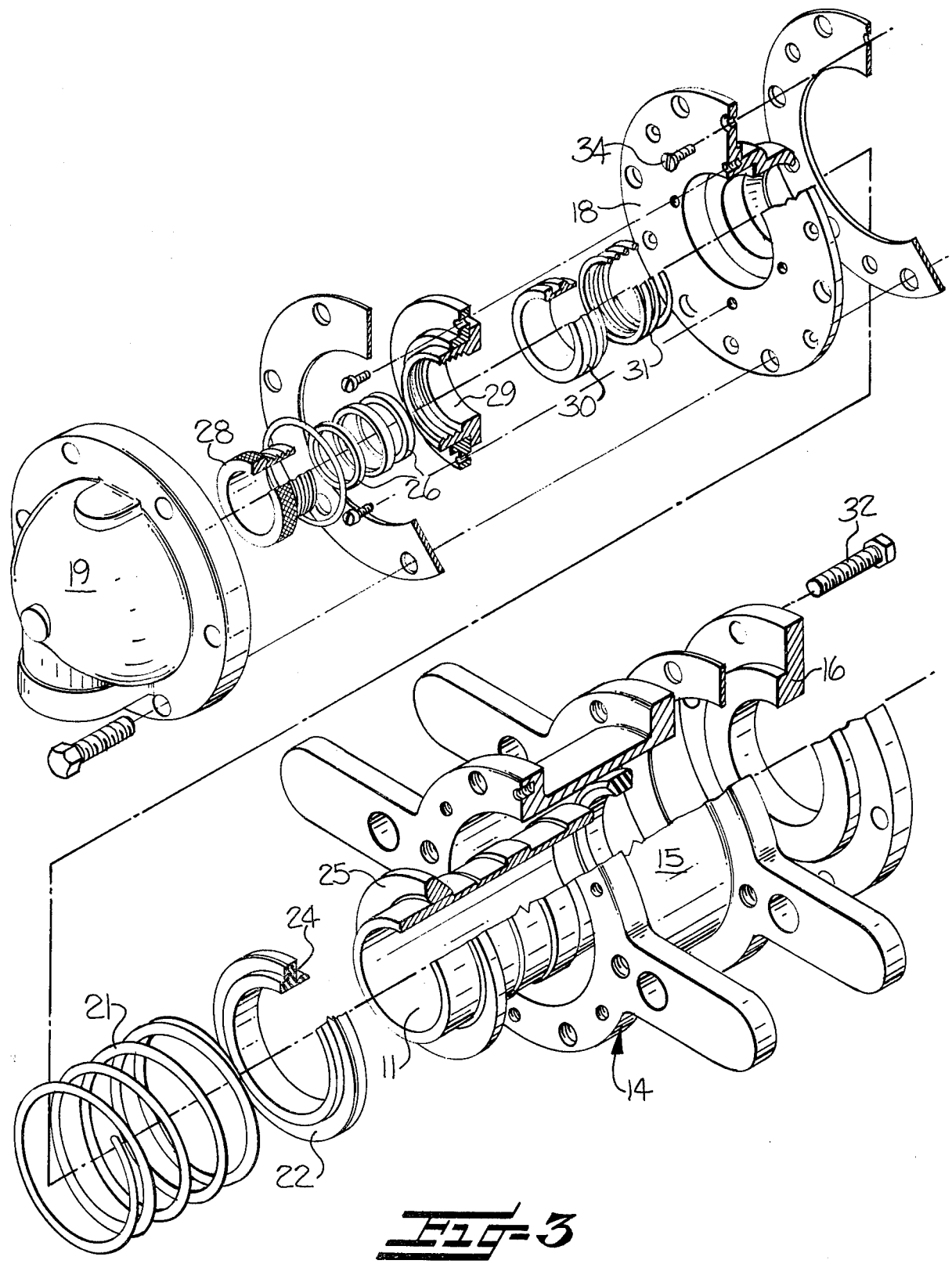
FIG. 3 is an exploded perspective view of the elements of the rotating joint of this invention.

While the present invention will be described more fully hereinafter with reference to the accompanying drawings, in which a preferred embodiment of the present invention is shown, it is to be understood at the outset of the description which follows that persons or skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

As illustrated in the accompanying drawings, the rotating joint of the present invention as generally indicated at 10 has a hollow shaft means 11 for coupling with and rotation with a roll, drum or the like. The hollow shaft means 11, as is generally known to persons skilled in the appropriate arts, may be constructed with threads or with a quick-connect structure of grooves for engagement with the journal portion of the rotating drum or roll. The hollow shaft means 11 typically provides supply fluid communication, passing steam into the interior of the rotating drum. The hollow shaft means 11 encircles a syphon pipe 12, through which condensate or water is removed from the interior of the rotating drum.

One end of the hollow shaft means 11 and of the syphon pipe 12 is enclosed within a stationary housing means, generally indicated at 14. As pointed out more fully hereinafter, the stationary housing means 14 comprises a number of components, which together enclose portions of the shaft 11 and syphon pipe 12. In particular, the housing means 14 comprises an elongate housing body 15, a shaft end flange means 16 closing one end of the body and encircling the shaft means 11 and the syphon pipe 12 therewithin, and a syphon end flange means 18 for closing the other end of the housing body. The syphon end flange means is covered by a head end portion 19. Fluid flow ports are provided in the housing body 15 and in the head 19, for the admission of steam into the rotating drum and the removal of condensate therefrom.

In order that the housing means 14 may be restrained against rotation, the elongate housing body 15 has lateral projections extending perpendicularly outward therefrom for restraining engagement and maintaining the housing means stationary during rotation of the coupled drum. More specifically, the rotating joint to which the present invention is directed is of the type known as "rod mounted", in that the lateral projections have holes or openings bored therein for receiving mounting rods. Rotating joints of this general class will be known to persons of skill in the appropriate arts.

Mounted within the housing means 14 are shaft bearing and seal means for mounting shaft means 11 for rotation relative to the housing means 14 while sealing against fluid leakage about the shaft means. In the form illustrated, the shaft bearing and seal means comprises a seal element 20 abutting the shaft and flange means 16, spring means 21 for biasing the seal means toward sealing engagement and abutting the syphon end flange means 18 for reasons to be pointed out more fully hereinafter, a torque plate 22, and a bearing 24 abutting the torque plate 22. The torque plate 22 functions to decrease or eliminate oscillation or vibration of the spring means 21 otherwise occurring due to "stick-slip" action during rotation of the shaft means 11 relative to or with the bearing 24. The shaft means 11 is formed with an enlarged sealing portion 25, abutted by the bearing 24. The enlarged sealing portion 25 of the shaft 11 and the seal element 20 of the sealing means each define a part spherical sealing surface, with the sealing surface being in sealing engagement one with another so as to seal against fluid leakage about the shaft means 11. In accordance with significant features of the present invention, syphon pipe bearing and seal means are mounted within the housing means 14 in spaced relation to the shaft bearing and seal means described hereinabove. The syphon pipe bearing and seal means mount the syphon pipe 12 for rotation relative to the housing means 14 while sealing against fluid leakage about the syphon pipe 12. The separation of the bearing and sealing functions for the hollow shaft 11 and syphon pipe 12 accomplish significant results for the rotating joint of the present invention, as mentioned above and described hereinafter. More particularly, the syphon pipe 12 is gripped by a pair of compression ferrules 26 and is thereby secured to a compression nut 28 and a face ring 29 which performs the functions of a syphon pipe bearing means. The face ring 29 rotates within the syphon end flange 18, thereby providing a separate bearing support for the syphon pipe. Additionally, the face ring member 29 defines a planar surface extending perpendicularly to the syphon pipe 12. The planar surface of the face member 29 is engaged by a similar planar sealing surface of a seal element 30 which is received within the syphon end flange 18. A spring member 31 similarly contained within the syphon end flange 18 biases the seal member 30 toward the face member 29, so as to maintain sealing forces. The end of the face member 29 remote from the seal member 30 is retained by a flange, with the syphon end flange 18 defining a clearance for accommodating axial movement of the syphon pipe 12.

As will be understood, the elements described above are maintained in assembled relation with a plurality of bolts 32. Additionally, the syphon end flange 18 is secured to the housing body 15 by concealed bolts 34. Should it become necessary to do so, the joint of the present invention may be disassembled by removing the head 19 so as to gain access to the sealing elements for the syphon pipe. By such access, sealing elements or bearing elements requiring replacement may be serviced. Similarly, by removing the shaft end flange 16, the bearing and seal components related to the shaft 11 may be reached for service or replacement.

In the drawings and specification, there has been set forth a preferred embodiment of the invention, and although specific terms are employed, they are used in a generic and descriptive sense only and not for purposes of limitation.

That which is claimed is:

1. A rotating joint for establishing supply and return fluid flow connections between stationary piping and a rotating drum and syphon pipe, said joint comprising:
    hollow shaft means for coupling and rotation with said drum and for encircling said syphon pipe,
    stationary housing means for enclosing one end of said shaft means and one end of said syphon pipe and comprising an elongated housing body,
    shaft bearing and seal means mounted within said housing means for accommodating rotation of said shaft means relative to said housing means while sealing against fluid leakage about said shaft means,
    syphon pipe bearing and seal means mounted within said housing means in spaced relation to said shaft bearing and seal means for mounting said syphon pipe for rotation relative to said housing means while sealing against fluid leakage about said syphon pipe,
    shaft end flange means for closing one end of said body and for encircling said shaft means and said syphon pipe therewithin,
    syphon end flange means disposed within said housing body for closing the other end of said body, and
    said shaft bearing and seal means comprising a seal element abutting said shaft end flange means and spring means for biasing said seal means toward sealing engagement and abutting said syphon end flange means.

2. A rotating joint for establishing supply and return fluid flow connections between stationary piping and a rotating drum and syphon pipe, said joint comprising:
    hollow shaft means for coupling and rotation with said drum and for encircling said syphon pipe,
    stationary housing means for enclosing one end of said shaft means and one end of said syphon pipe and comprising an elongated housing body,
    shaft bearing and seal means mounted within said housing means for accommodating rotation of said shaft means relative to said housing means while sealing against fluid leakage about said shaft means,
    syphon pipe bearing and seal means mounted within said housing means in spaced relation to said shaft bearing and seal means for mounting said syphon pipe for rotation relative to said housing means while sealing against fluid leakage about said syphon pipe,
    shaft end flange means for closing one end of said body and for encircling said shaft means and said syphon pipe therewithin,
    syphon end flange means disposed within said housing body for closing the other end of said body, and
    said syphon pipe bearing and seal means comprising a seal element encircled by said syphon end flange means, and spring means for biasing said seal means toward sealing engagement and encircled by said syphon end flange means.

3. A rotating joint according to claim 2 wherein said syphon end flange means and said syphon pipe bearing and seal means accommodate axial movement of said syphon pipe.

4. A rotating joint for establishing supply and return fluid flow connections between stationary piping and a rotating drum and syphon pipe, said joint comprising:
    hollow shaft means for coupling and rotation with said drum and for encircling said syphon pipe,
    stationary housing means for enclosing one end of said shaft means and one end of said syphon pipe,
    shaft bearing means mounted within said housing means for accommodating rotation of said shaft means relative to said housing means,
    shaft seal means mounted within said housing means for sealing against fluid leakage about said shaft means,
    syphon pipe bearing means mounted within said housing means in spaced relation to said shaft bearing means and said shaft seal means and for mounting said syphon pipe for rotation relative to said housing means, syphon pipe seal means mounted within said housing means in spaced relation to said shaft seal means for sealing against fluid leakage about said syphon pipe, and said syphon pipe seal means comprising a seal element defining a planar sealing surface extending perpendicularly to said syphon pipe, and a face member fixed to said syphon pipe for rotation therewith and defining a planar surface extending perpendicularly to said syphon pipe, said planar surfaces being in sealing engagement one with another.

5. A rotating joint according to claim 4 wherein said shaft seal means comprises a seal element defining a part-spherical sealing surface, and further wherein said shaft means has an enlarged sealing portion defining a part-spherical sealing surface, said sealing surfaces being in sealing engagement one with another.

6. A rotating joint according to claim 4 further comprising flange means within said housing means encircling said face member and defining a clearance for accommodating axial movement of said syphon pipe.

* * * * *